US006484198B1

(12) United States Patent
Milovanovic et al.

(10) Patent No.: US 6,484,198 B1
(45) Date of Patent: Nov. 19, 2002

(54) METHOD AND DEVICE FOR AUTOMATED TRANSFER AND MAINTENANCE OF INTERNET BASED INFORMATION

(75) Inventors: Rajko Milovanovic, Plano, TX (US); Bharathi Subramanian, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/248,508

(22) Filed: Feb. 10, 1999

Related U.S. Application Data
(60) Provisional application No. 60/074,211, filed on Feb. 10, 1998.

(51) Int. Cl.[7] .............................................. G06F 15/16
(52) U.S. Cl. ........................ 709/218; 709/217; 709/219; 709/245; 709/249; 707/10
(58) Field of Search ................................. 709/218, 219, 709/245, 249; 705/14; 707/10

(56) References Cited

U.S. PATENT DOCUMENTS

| 5,291,243 A | 3/1994 | Heckman et al. ............ 355/201 |
| 5,307,456 A | 4/1994 | MacKay ..................... 395/154 |
| 5,308,058 A | 5/1994 | Mandel et al. .............. 271/297 |
| 5,328,169 A | 7/1994 | Mandel ....................... 271/290 |
| 5,331,547 A | 7/1994 | Laszlo | |
| 5,342,034 A | 8/1994 | Mandel et al. ................ 270/53 |
| 5,358,238 A | 10/1994 | Mandel et al. .............. 271/298 |
| 5,390,910 A | 2/1995 | Mandel et al. .............. 271/296 |
| 5,496,071 A | 3/1996 | Walsh | |
| 5,513,126 A | 4/1996 | Harkins et al. .......... 364/514 A |
| 5,550,561 A | 8/1996 | Ziarno ........................ 345/163 |
| 5,625,818 A | 4/1997 | Zarmer et al. | |
| 5,640,193 A | 6/1997 | Wellner ......................... 348/7 |
| 6,061,738 A | * 5/2000 | Osaku et al. ................ 709/245 |
| 6,108,656 A | * 8/2000 | Durst et al. .................... 707/10 |
| 6,148,331 A | * 11/2000 | Parry .......................... 709/218 |
| 6,418,441 B1 | * 7/2002 | Call ............................. 707/10 |

FOREIGN PATENT DOCUMENTS

| EP | 0 520 459 A2 | 12/1992 |
| EP | 0 697 793 A2 | 2/1996 |
| WO | WO 98/03923 | 1/1998 |

* cited by examiner

Primary Examiner—Wellington Chin
Assistant Examiner—Chuong Ho
(74) Attorney, Agent, or Firm—Ronald O. Nerrrings; Wade J. Brady, III; Frederick J. Telecky, Jr.

(57) ABSTRACT

A method of transferring electronic equivalents (32) of published items (18) is provided wherein bar codes (116, 118) are attached on the items (18) prior to distribution to subscribers (12). The bar codes (116, 118) are scanned by a bar code reader (22), formatted into a predetermined message format compatible with network protocols and transmitted to the associated publishing authority (30). Based on the bar code information, the publisher (30) will either push the requested electronic equivalent (32) or transfer a pointer to the user (12) to a network cite containing the requested electronic equivalent (32). Alternatively, the publisher (30) can push updates of published items (32) to users (12).

22 Claims, 3 Drawing Sheets

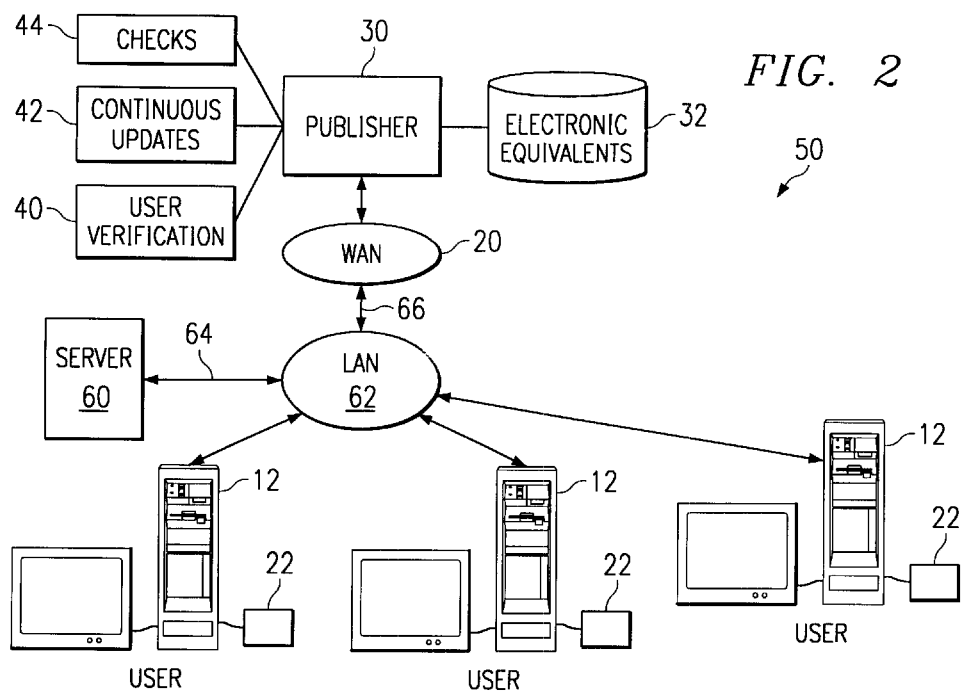
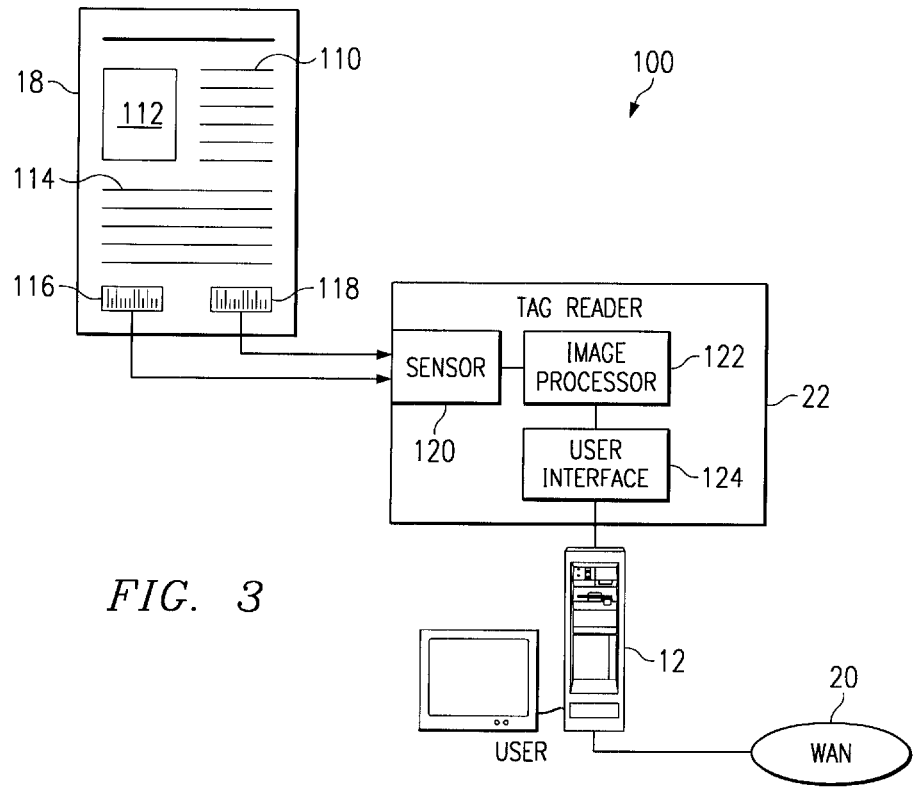

METHOD AND DEVICE FOR AUTOMATED TRANSFER AND MAINTENANCE OF INTERNET BASED INFORMATION

This amendment claims priority under 35 USC §119(e)(1) of provisional application No. 60/074,211, filed Feb. 10, 1998.

TECHNICAL FIELD

The present invention relates in general to the electronic exchange of information and more particularly to a method and system for obtaining the electronic equivalent of a published item using an identifying tag attached to the item.

BACKGROUND OF THE INVENTION

The quantity and variety of published materials such as newspapers, magazines, journals and other similar printed articles (collectively "published items") keep increasing. Often, a subscriber will want to use a published item, or portion thereof, for incorporation into other documents or for storage for future use. Physical storage of the item, however, may be inefficient and/or impractical. With recent advances in small computing systems such as notebook and desktop computers, however, and increased functionality of the application programs that run them, it is now possible to retrieve, store and maintain published items electronically.

The electronic equivalent of a published item offers many advantages including reduced paper clutter, easy integration into other electronic documents, portability and easy transfer to others using electronic mail. Moreover, the widespread use of software application programs such as word-processors, spreadsheets and graphics programs, creates an ideal environment for the use of electronic equivalents. For example, an individual subscriber may desire to possess the electronic equivalent of a publication received in the mail. The publication may contain a graphic, listing, table or other similar piece of information of interest to the individual. Copying the item with an ordinary copy machine will not permit the user to alter, shape or size it to fit his or her needs. On the other hand, recreating the item may be time consuming or impossible if the item is a complicated graphic or long data listing. Scanning or Optical Character Recognition ("OCR") can be cumbersome with the resulting image being of lesser quality than the original.

The electronic equivalent of a published item, on the other hand, could be stored for future use, printed, sized and otherwise manipulated with readily available application software programs In addition, a publisher may desire to distribute electronic equivalents of published items to his subscribers on a regular or request basis. Electronic equivalents may allow the publisher to reduce printing costs and provide publication updates quickly and efficiently. The Internet, with its widespread use and ease of access, provides an ideal networking platform for such purposes.

SUMMARY

The invention relates to a method and device of push-pulling electronic equivalents of published items such as magazine articles, journals, newspapers or portions thereof and other similar printed materials over a wide area network such as the Internet.

In one embodiment, one or more electronic tags (e.g. bar codes) are attached by the publisher directly on the published item or a portion of the published item prior to distribution to subscribers. A subscriber receives the subscription through the mail or other off-network basis and sends a request for an electronic equivalent of the published item on the network by swiping or entering the tag information into a sensing device. Preferably, the sensing device is an electronic bar code reader coupled directly to the subscriber's computer. A notebook, desktop computer or similar computing means receives the tag information from the sensing device and formats a network compatible request that is transmitted to the publishing authority over the network.

The tag information may include the identity of the subscriber on the network (e.g. the subscriber's e-mail address) and a reference to the particular item being requested by the subscriber. The request is receive and processed by the publisher who, in turn, formats a response message containing the electronic equivalent of the requested item or a pointer to a network cite (e.g. a URL) containing the item. The response is pushed to the user via the network using the address encoded in the requesting message and received at the user's computer in due course. Alternatively, the publisher can push the address that points the user to a web page on the Internet containing the electronic equivalent requested by the user.

In another embodiment, the publisher searches a database of update users and automatically pushes publication updates on a periodic basis using a subscriber's electronic address. The publisher may also send an electronic message alerting users that an electronic equivalent of an original or updated item is available for download by the user.

In still another embodiment, the publisher pushes electronic equivalents of published items to a local server for access by users having log-on privileges to the server.

In yet another embodiment, the publisher encodes the electronic equivalents with a video clip, sound clip or other information content not available with the written version.

Also disclosed is a method of transferring electronic equivalents of published items over a wide area network. The method comprises the steps of attaching a tag to a published item prior to distribution; distributing the published item to a subscriber on an off-network basis; using the tag to create a request for an electronic equivalent of the published item; transmitting the request on the wide area network; creating a response to the request; and transmitting the response over the wide area network.

In another embodiment, a method of transferring an electronic version of a published article over the Internet is disclosed. The method comprises the steps of reading a bar code associated with the published article; encrypting said bar code into an Internet compatible request message; transmitting said request message over the Internet to the publisher of said published article; decoding said message to obtain the bar code; retrieving the electronic version of the published article associated with the bar code; creating a response message containing a pointer to the electronic version; and transmitting the response message to the originator of the request message.

Other aspects and advantages of the invention including its specific implementations are understood by reference to following detailed description taken in conjunction with the accompanying drawings.

BRIEF DESCRIPTION OF THE DRAWINGS

In the drawings:

FIG. 2 is a high level of a network architecture for pushing user requested electronic equivalents to a local server for access by users according to one embodiment;

FIG. 3 illustrates the bar coding process according to one embodiment; and

Corresponding numerals in the figures refer to corresponding parts unless otherwise indicated.

DETAILED DESCRIPTION OF THE PREFERRED EMBODIMENTS

Figure 1:
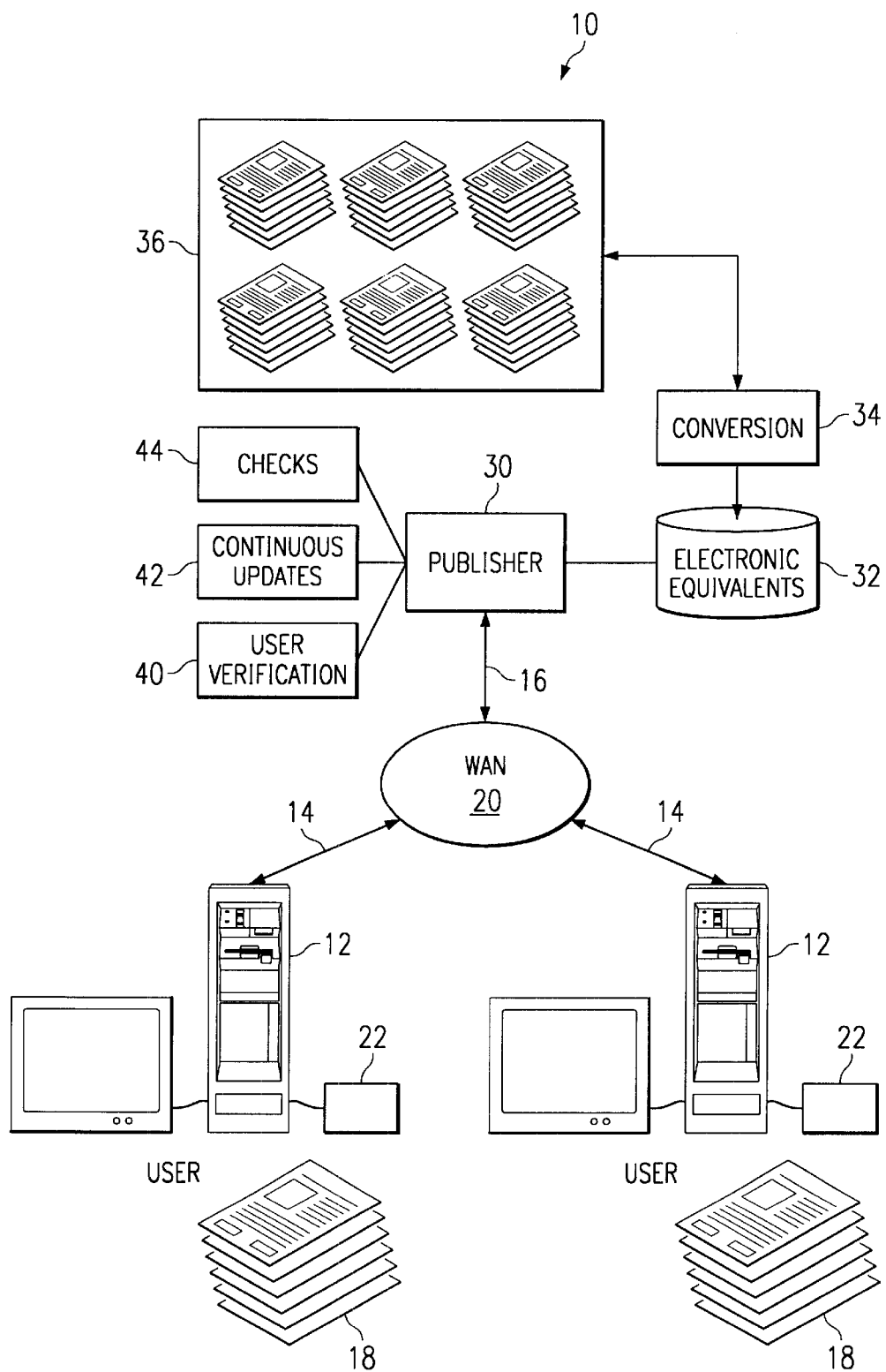
FIG. 1 is a high-level block diagram of an architecture for transferring electronic equivalents over a network according to one embodiment.

In FIG. 1, the architecture for transferring electronic equivalents over a Wide Area Network ("WAN") 20 according to the invention is shown and denoted generally as 10. As shown, a plurality of users 12 have access to WAN 20 via links 14. Links 14 represent the communications pathway between the WAN 20 and the users 12 and, as such, may comprise a wide array of communications equipment and mediums for permitting users 12 to interface with the WAN 20 and other network entities such as publisher 30. Suitable examples of the links 14 include dial-up lines on the Public Switched Telephone Network ("PSTN"), high speed dedicated T1 lines, a direct connection or an ISDN line among others and includes the switching and routing equipment, service providers and other communications components known to those of ordinary skill.

The users 12 include both the individual subscribers as well as the end-user terminal equipment used by the subscribers to gain access to the WAN 20. Typically, a user workstation such as a desktop and notebook computer, dedicated terminals or other similar computing device is located at the user 12 location. In that regard, each user terminal may be equipped with other standard components such as a keyboard, mouse, hard disk, compact disk drive, floppy disk drive, display, electronic memory (e.g. RAM or ROM), a processor, various peripheral interfaces ports and other standard components. A modem or network interface card may also be installed at the user terminal 12 to provide access to the WAN 20 using the PSTN or other network gateway.

Preferably, the WAN 20 supports an industry accepted communications protocol such as TCP/IP. The communications protocol provides electronic access to the WAN 20 by a large number of users 12 and provides the communications infrastructure. In one embodiment, the Internet forms the WAN 20 infrastructure consisting of an unlimited number of computing platforms, service providers and users. Publisher 30 gains access to the WAN 20 via link 16.

As shown, a repository of electronic equivalents 32 is maintained by the publisher 30 corresponding to a plurality of published items 36 which the publisher 30 has decided to make available to users 12. The type and content of the published items 36 may include portions of published articles, entire stories, abstracts, tables, graphics and other similar printed information. The published items 36 are typically distributed to users 12 on an off-network basis such as through the mail or by courier. A typical example is one where the publisher 30 sends magazine subscription to subscribers on a periodic basis.

Thus, a user 12 receives a copy 18 of one of the published items 36 and places a request for an electronic equivalent 32 of the copy 18 through the WAN 20 using link 14. The publisher 30 receives the request and verifies that an equivalent 32 is available for transmission to the user 12 on the WAN 20 through link 16. The publisher maintains a collection of all published items 36 and after deciding which one he will make available to users 12 converts 34 them to electronic equivalents 32. Once in the repository they are available for transmission to users 12 on the WAN 20.

Preferably, each user terminal 12 is equipped with a corresponding sensing device 22 which the subscriber can employ to request electronic equivalents of written copies 18 received from the publisher 30. Various sensing devices 22 may be utilized although a bar code reader of the type commonly available in industry is suitable. Other possibilities for the sensing device 22 can be a magnetic strip or optical signal reader as is understood by those of ordinary skill.

The publisher 30 encodes the published items 36 with an identifying tag such as a bar code or magnetic signature prior to distribution of the copies 18 to users 12. A user 12, in turn, reads his copy 18 of the written source and makes a decision about a particular article, graphic or other object appearing on the copy 18 which is of interest to the user 12. Next, the user 12 swipes across the sensing device 22 which reads the tag and formats a network ready request for transmission to the publisher 30 via the WAN 20 and link 14. The tag ID, user address and publisher address are contained within the message request.

Once the request has been received, the publisher 30 decodes the request. At this point, the publisher 30 may wish to verify 40 the authenticity of the user prior to checking 44 if an electronic equivalent 32 of the requested object is available. In one embodiment, the user 12 has the option of requesting continuous updates 42 from the publisher 30 in which case the publisher 30 may push updates to the user 12 on a periodic basis at the users network address.

As can be appreciated, the architecture 10 gives the publishers 30 much flexibility in the methods used to push electronic equivalents 32 to users 12. For example, the publisher 32 can charge a premium based on the number of equivalents 32 transmitted to a user 12 over a given time interval. In another embodiment, the publisher 30 encodes the electronic equivalents with a video or sound clip not available with the written version 18. Other options and alternatives will become apparent to those of ordinary skill.

Once the electronic equivalents 32 are received by users 12, they can be stored locally on the computer's hard disk drive or other medium for future use. Users 12 can manipulate the object using application software of the type readily available in industry. Preferably, commonly employed file formats when converting the published items 36 to their electronic equivalents 32 for widespread compatibility with application software and other programs employed by users 12 and the publisher 30. Alternatively, the publisher 30 can distribute custom software for creating the message request, decoding the message request and opening or otherwise manipulating the electronic equivalents 32. Other methods of transferring, storing and using the electronic equivalents 32 will be apparent to those of ordinary skill.

Turning to FIG. 2, an architectural block diagram of a local network configuration suitable for pushing and retrieving electronic equivalents 32 is shown and denoted generally as 50. The main distinction is the use of a local network server 60, which is accessible by users 12 via the Local Area Network (LAN) 62. As shown, a connection 64 links the server 60 and the LAN 62. The LAN 62 in turn is communicably coupled to the WAN 20 via link 66. Typically, a network manager is responsible for the setup and maintenance of the network server 60 and administrates the users 12 on the LAN 62. Other network features may also be provided.

The main advantage of network configuration 50 is that the electronic equivalents 32 are now kept in a central repository (not shown) maintained by the server 60. Thus, large files received from the publisher 30 can be maintained locally for all users 12 eliminating the need of storing multiple copies of the file for each user 12 while permitting access on an as needed basis. Thus, the server 60 can format requests to the publisher 32 and receive the requested electronic equivalents 32, which, in turn, are available to all users 12 on the LAN 62. In another embodiment, continuous updates 42 are automatically pushed from the publisher 30 to the network server 60 where they are available for retrieval by all users 12. Still other features of network configuration 50 will be apparent.

A user 12 places the page 18 in close proximity to the bar code reader sensor 120 so that the tags 116 and 118 are readily identified using known recognition techniques. The sensor 120 and image processor 122 work together to resolve the data on the tags 116, 118 and pass the data to the user terminal 12 via the user terminal interface 124. In this way, the user 12 is able to format a message request to the publisher 30 for an electronic equivalent 32 of the published item.

As shown, two distinct bar code tags 116, 118 are used on the published item 18 to provide at least two distinct request options. For example, tag 116 could be used to designate a single request for the objects 110, 112 or 114 appearing on copy 18 while tag 118 can be used to request an update to the copy 18 when it becomes available from the publisher. It should be understood, however, that other bar code options may be provided by a publisher 30 and that the number and placement of tags may vary according to various embodiments.

Figure 4:
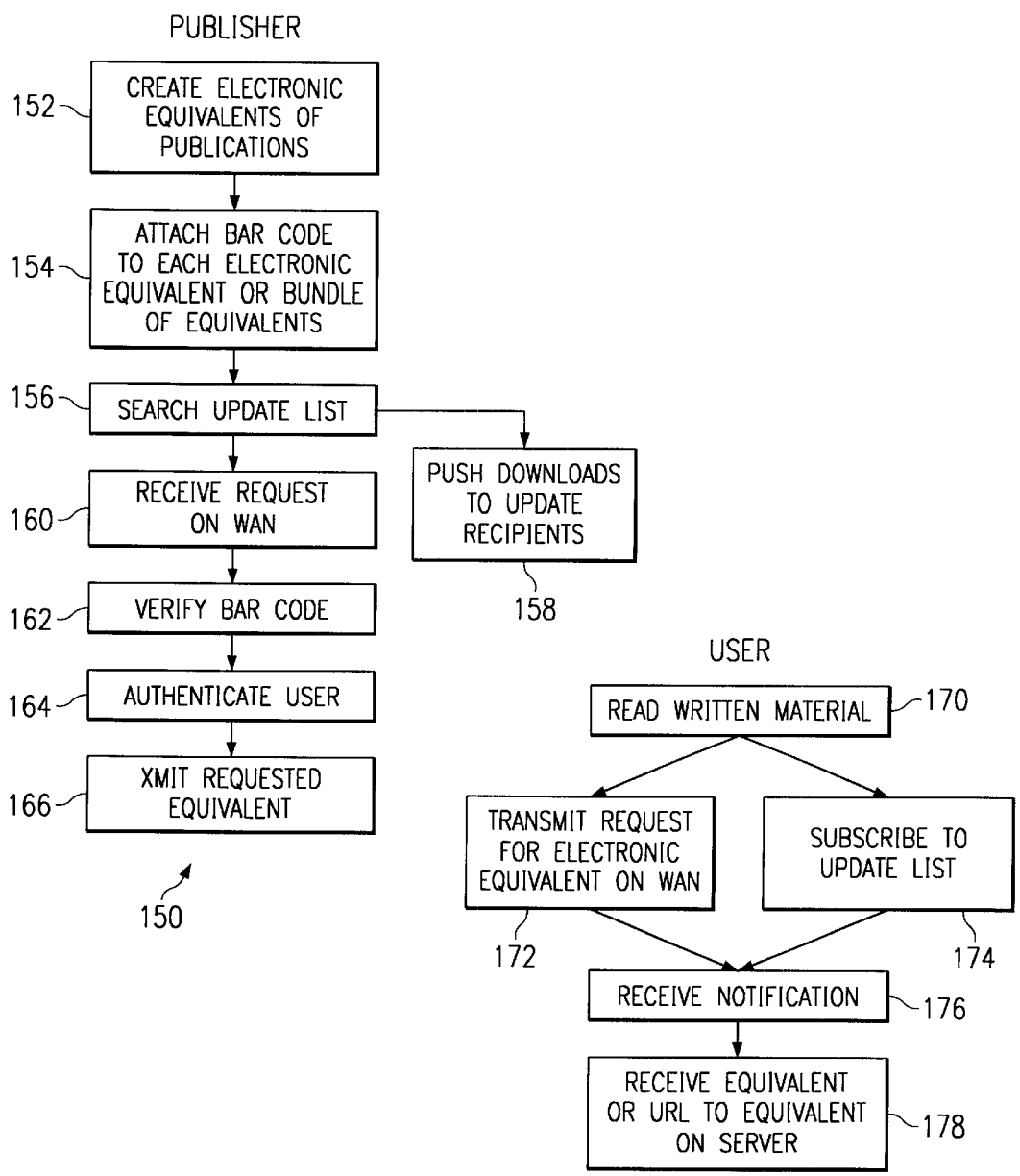
FIG. 4 is a process flow diagram for transmitting electronic equivalents to users according to one embodiment.

In FIG. 4, a process flow diagram for the method used to transfer electronic equivalents 32 is shown and denoted generally as 150. Process 150 begins at step wherein a publisher creates electronic equivalents of designated published items. Next, in step 154, the publisher attaches a bar code tag to each electronic equivalent or to a bundle of equivalents depending on the publisher's choice. Prior to transmission, the publisher has the option of searching his update list, step 156, and automatically pushing any equivalents to update recipients at their network address as shown in step 158.

Process 150 continues with step 160 wherein the publisher receives a request for a specific electronic equivalent or for updates to a published item. The publisher is able to verify the bar code tag encoded within the message, step 162, and authenticate that the user sending the message is an authorized subscriber, step 164, prior to transmitting the requested equivalent in step 166.

On the user side of the process 150, a subscribing user obtains and reads a published item provided to him by a given publisher, step 170. Next, the user has the option of transmitting a request to the publisher for a specific electronic equivalent, step 172, or of subscribing to an update list for the published item, step 174. In either case, the message request is formatted using the sensing device 22 and the user's terminal 12 and broadcast over the WAN 20 as herein described.

Next, in step 176, the user receives a notification from the publisher which serves to confirm that the user's request was received by the publisher or that the user was successfully added to the publisher's update list whichever the case may be. Finally, the user receives an electronic equivalent or an address pointer to an electronic equivalent, step 178.

While this invention has been described in reference to illustrative embodiments, the invention is not intended to be construed in a limiting sense. Various modifications and combinations of the illustrative embodiments, as well as other embodiments of the invention, will be apparent to persons skilled in the art upon reference to this description. It is therefore intended that the appended claims encompass any such modifications or embodiments.

What is claimed is:

1. A method of transferring electronic equivalents of published items over a wide area network comprising the steps of:

attaching a tag to a published item prior to distribution;

distributing the published item to a subscriber;

using the tag to create a request of an electronic equivalent of the published item;

transmitting the request on the wide area network;

creating a response message to the request, said response message excluding said electronic equivalent of the published item, updates to said published item and address pointers to said published item and updates to said published item; and transmitting the response message over the wide area network.

2. The method according to claim 1 wherein the step of distributing the published item to a subscriber is performed on an off-network basis.

3. The method according to claim 1 wherein the step of attaching a tag to a published item prior to distribution comprises the further steps of:

assigning a bar code identifier to the published item; and attaching the bar code identifier on the published item.

4. The method according to claim 1 wherein the step of using the tag to create a request for an electronic equivalent comprises the further step of creating an electronic message that included the network address of the requesting user, the subscriber address and the bar code printed on electronic equivalent.

5. The method according to claim 1 wherein the step of creating a response message to the request comprises the further step of attaching the electronic equivalent of the published item to the response message.

6. The method according to claim 4 further comprising the steps of:

decoding the response to obtain the electronic equivalent; and storing the electronic equivalent in local repository for future use.

7. The method according to claim 5 further comprising the step of using an application program to manipulate the electronic equivalent.

8. A method of transferring an electronic version of a published article over the Internet comprising the steps of:

reading a bar code associated with the published article;

encrypting said bar code into an Internet compatible request message;

transmitting said request message over the Internet to the publisher of said published article;

decoding said message to obtain the bar code;

retrieving the electronic version of the published article associated with the bar code;

creating a response message, said response message excluding said electronic version of the published article, updates to said published article and address pointers to said published item and updates to said published article; and transmitting the response message and address pointer to said electronic equivalent of the published article to the originator of the request message.

9. The method according to claim 8 wherein said pointer is a link to an Internet web site containing the electronic version of said published article.

10. The method according to claim 8 wherein said pointer is a link to an Internet web site containing the electronic version of an update to said published article.

11. The method according to claim 8 wherein said pointer is an attachment file containing the electronic version of said printed article.

12. The method according to claim 8 further comprising the steps of:

periodically searching a list of update subscribers to determine their Internet address: and pushing electronic versions of published articles to update subscribers at their Internet address.

13. A system for transmitting electronic equivalents of published items on a wide area network comprising:

at least one user terminal linked to said wide area network, said terminal containing a communications link to other network entities and application programs for sending and receiving messages to said entities;

a sensing device coupled to said user terminal;

a publisher terminal linked to said network and arranged to receive and send messages to said user terminal via said wide are network;

a repository for storing said electronic equivalents, said repository coupled to said publisher terminal; and wherein said publisher terminal is configured to receive a message request from said user terminal, said message request containing the bar code contents associated with at least one electronic equivalent corresponding to at least one published article said publisher terminal further configured to create a response message, excluding updates to said published article, address pointers to said published article and updates to said published article, to said message request, retrieve said electronic equivalent from and repository and transmit said response message and said electronic equivalent to said user in response to said message request.

14. The system according to claim 13 wherein said wide area network is the Internet.

15. The system according to claim 13 wherein said user terminal comprises a computer with an internal storage medium for storing said electronic equivalent of said published article.

16. The system according to claim 13 wherein said computer further contains a plurality of application programs for manipulating said electronic equivalent of said published article.

17. The system according to claim 13 further including a web site wherein said electronic equivalent is maintained for access by a plurality of Internet users.

18. The system according to claim 13 wherein said sensing device is a bar code reader.

19. The system according to claim 13 further comprising:

a local area network linked to said wide area network; and a plurality of user terminals coupled to said local area network and having centralized access to said wide area network via said local area network.

20. The system according to claim 19 further comprising a server coupled to said local area network and configured to permit receive electronic equivalents from said publisher terminal and maintain them for use by said user terminals.

21. A method of transferring an electronic version of a published article over the Internet comprising the steps of:

reading a bar code associated with the published article;

encrypting said bar code into an Internet compatible request message;

transmitting said request message over the Internet to the publisher of said published article;

decoding said request message to obtain the bar code;

determining whether said request message is a request for an electronic copy of said published article or a request for an update to said published article;

retrieving the electronic version of said determined one of said published article and said update to said published article, associated with the bar code;

creating a response message containing a pointer to said determined one of said electronic version of said published article and said update to said published article; and transmitting the response message to the originator of the request message.

22. A system for transmitting electronic equivalents of published items and updates to said published items on a wide area network comprising:

at least one user terminal linked to said wide area network, said terminal containing a communications link to other network entities and application programs for sending and receiving messages to said entities;

a sensing device coupled to said user terminal;

a publisher terminal linked to said network and arranged to receive and send messages to said user terminal via said wide are network;

a repository for storing said electronic equivalents, said repository coupled to said publisher terminal; and wherein said publisher terminal is configured to receive a message request from said user terminal, said message request containing the bar code contents associated with at least one of an electronic equivalent corresponding to at least one published article and an update to said published article, said publisher terminal further configured to create a response message to said message request, retrieve one of said electronic equivalent of said published article and said update of said published article from said repository and transmit said response message and said selected one of said electronic equivalent and said update to said user in response to said message request.

* * * * *